(No Model.)
R. W. DAVIS.
WHEEL FOR VEHICLES.
No. 251,196. Patented Dec. 20, 1881.
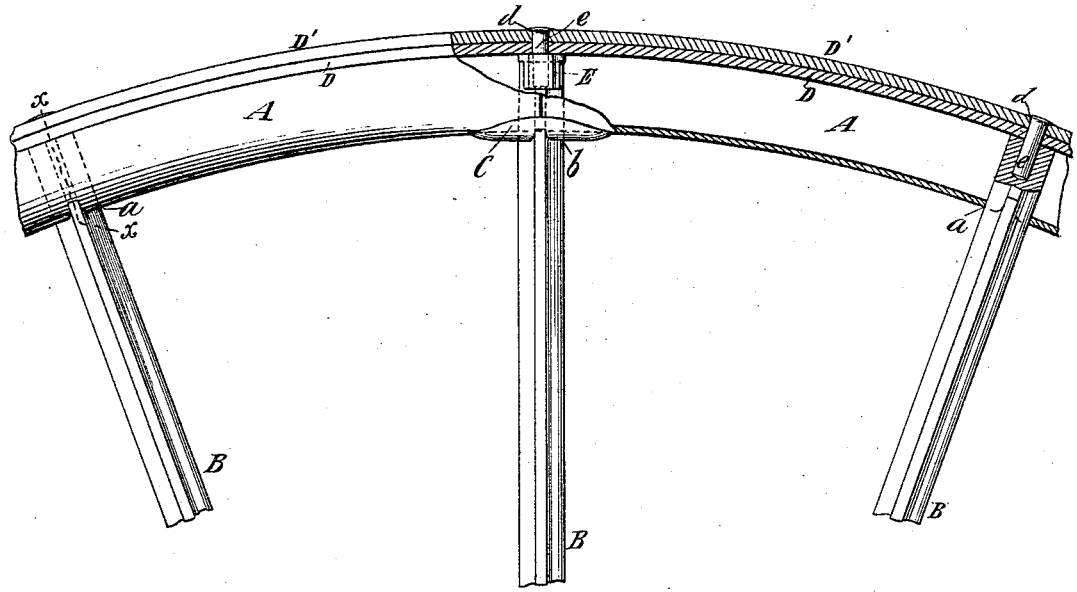
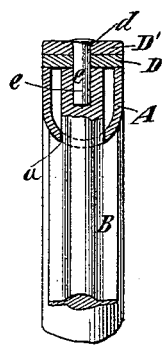
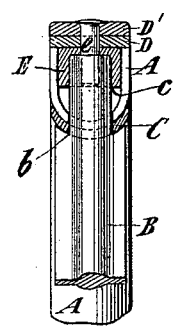
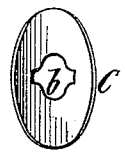
Witnesses:—
Fred K Haynes
Ed. Moran
Inventor:—
Robert W Davis
by his Attorneys
Brown & Brown

UNITED STATES PATENT OFFICE.

ROBERT W. DAVIS, OF ELMIRA, NEW YORK, ASSIGNOR TO THE DAVIS IMPROVED WROUGHT IRON WAGON WHEEL COMPANY, OF SAME PLACE.

WHEEL FOR VEHICLES.

SPECIFICATION forming part of Letters Patent No. 251,196, dated December 20, 1881.

Application filed October 27, 1881. (No model.)

*To all whom it may concern:*

Be it known that I, ROBERT W. DAVIS, of Elmira, in the county of Chemung and State of New York, have invented certain new and useful Improvements in Wheels, of which the following is a specification.

My invention relates to wheels made of metal, and more particularly to wheels in which the fellies are of U-shaped transverse section.

My invention consists in the combination, in a wheel, of a U-shaped felly, spokes the ends of which are tenoned and pass through the felly, and which have holes in their ends, a tire, and dowel-pins inserted through holes in the tire and driven into the holes in the ends of the spokes; also, in the combination, with a felly of U-shaped transverse section and its tire, of spokes having tenons at the ends which pass through the felly, filling-blocks fitting in the felly and over the ends of the spokes, and dowel-pins inserted through the tire and filling-blocks and driven into the ends of the spokes; also, in the combination, with a U-shaped felly composed of sections and tenoned spokes, of filling-blocks fitting on the spoke-tenons within the abutting felly-sections, and curved plates, also fitting on the spoke-tenons and bearing against the inner periphery of the abutting felly-sections; also, in the combination of a U-shaped felly composed of sections, spokes having holes in their ends and passing through the felly, a double tire composed of inner and outer hoops or bands, and dowel-pins inserted through the tire and driven into the holes in the ends of the spokes, whereby, when the outer hoop or band becomes worn thin or stretches, it may be removed and renewed without distorting the shape of the felly, which is retained in place by the inner hoop or band; also, in details of construction to be hereinafter described.

In the accompanying drawings, Figure 1 represents a side view and partial section of a portion of the felly, spokes, and tire of a wheel of my improved construction. Fig. 2 represents a transverse section of the felly on dotted line *x x*, Fig. 1, and an edge view of the spoke. Fig. 3 represents a section similar to Fig. 2, taken at the junction of two of the felly-sections. Fig. 4 is a plan of the cap which fits on the inner side of the felly, and Fig. 5 represents an inverted plan of one of the filling-blocks which are fitted within the felly.

Similar letters of reference designate corresponding parts in all the figures.

A A designate two of the felly-sections of my improved wheel, which is represented as U shaped in its transverse section. They are formed by bending plate iron or steel into a U-shape, or troughing it; and the felly is, by preference, composed of three sections, though two or more sections may be used.

B designates the spokes, which are of bar iron or steel, and are star-shaped in transverse section, though they might be otherwise shaped to combine strength with light weight.

I have not shown any hub, as its construction forms no part of my invention, and any of the well-known metal hubs may be used.

The spokes are tenoned at their outer ends and passed through holes *a* in the felly; and in order to support the abutting ends of the felly-sections at their juncture I employ plates C, which are curved to fit upon the curved exterior of the felly, and have in them openings *b*, (see Fig. 4,) fitting the shape of the tenon. The plates C may also be placed on all the spokes of the wheels, if desired, and, as seen in Figs. 1 and 3, the plate rests upon the shoulder at the end of the spoke-tenon and the felly rests upon the plate.

D D' designate inner and outer hoops or bands, which form the double tire, which I prefer to employ, though a single tire may be sometimes used. Where the felly is composed of a number of sections this double tire is particularly advantageous, as the outer band, when worn thin or stretched, may be removed and a new outer band substituted without loosening the felly or other parts of the wheel or distorting their shape. The double tire has the additional advantage that it greatly increases the strength of the wheel.

The tenons of the spokes which pass through the felly at the juncture of abutting sections are not quite long enough to reach to the outer edges of the felly, as seen in Fig. 3, and over the ends of the tenons are fitted filling-blocks E, which may be composed of cast metal. These filling-blocks have in their under sides recesses *c*, which are of a shape to fit the tenon of the spoke, as seen in Fig. 5, and the metal at the bottom of this recess is of such a thickness that when applied to the spoke the outer surface of the filling-block will be flush with the edges of the felly, and will support the tire D D'. The filling-blocks E are of such a length that they fit snugly between the two sides of the felly on the inside, and both ends of the abutting sections bear upon the block, and are thus kept exactly in line with each other.

The tenons of the spokes which pass through the solid portions of the felly-sections, between their ends, are made slightly longer than the tenons of the spokes at the juncture of the felly-sections, and are flush with the edges of the felly; but they might be shorter and all the spokes have filling-blocks fitted upon them, if desirable.

The tire D D' has holes $d$ opposite the ends of the spokes, and through these are inserted dowel-pins $e$, which are driven tightly into the spokes and riveted down at the outer end on the tire. These dowel-pins pass through holes $f$ in the filling-blocks E, and it will be readily seen that the filling-blocks hold the ends of the spoke-tenons centrally between the sides of the felly, and through the spokes and dowel-pins hold the tire upon the felly, thus dispensing with the grooving of the tire, which is sometimes done in wheels of this kind having the U-shaped rim.

The hubs of these wheels are usually composed of several pieces, which may be taken off without disturbing the spokes, and in wheels of this character, if it is desired to replace a spoke, all that is required is to drive the spoke directly out of the felly by a punch applied to the outer end of the dowel-pin. A new spoke and dowel-pin may then be inserted and the hub replaced.

What I claim as my invention, and desire to secure by Letters Patent, is—

1. The combination, in a wheel, of a U-shaped metal felly, spokes the ends of which are tenoned and pass through the felly, and which have holes in their ends, a tire, and dowel-pins inserted through holes in the tire and driven into the holes in the ends of the spokes, substantially as specified.

2. The combination, in a wheel, with the U-shaped felly and its tire, of spokes having tenons at the ends which pass through said felly, filling-blocks fitted in the felly and over the ends of the spokes, and dowel-pins inserted through the tire and filling-blocks and driven into the ends of the spokes, substantially as specified.

3. The combination of the U-shaped felly A, the tenoned spokes B, the filling-blocks E, having recesses $c$ on their under sides to receive the spokes, the tire, and the dowel-pins $e$, substantially as specified.

4. The combination of the abutting felly-sections A A, the tenoned spokes B, the plate C, and the filling-block E, the abutting sections both bearing on said plate and filling-block, substantially as specified.

5. The combination of the U-shaped felly composed of sections, the spokes B, the dowel-pins $e$, and the double tire composed of outer and inner hoops or bands, D D', substantially as specified.

ROBERT W. DAVIS.

Witnesses:
DANIEL DAVIS,
ALBERT GOODNO.